US012795246B2

(12) United States Patent
Kim et al.

(10) Patent No.: US 12,795,246 B2
(45) Date of Patent: Nov. 10, 2026

(54) SWITCHING MECHANISM FOR QUAD-BAYER BINNING AND SUB-SAMPLING

(71) Applicant: Dell Products L.P., Round Rock, TX (US)

(72) Inventors: SeongYong Kim, Singapore (SG); Guentaek Oh, Singapore (SG); KyungEun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 116 days.

(21) Appl. No.: 19/011,692

(22) Filed: Jan. 7, 2025

(65) Prior Publication Data

US 2026/0197560 A1 Jul. 9, 2026

(51) Int. Cl.
*H04N 23/745* (2023.01)
*H04N 23/73* (2023.01)

(52) U.S. Cl.
CPC ........... *H04N 23/745* (2023.01); *H04N 23/73* (2023.01)

(58) Field of Classification Search
CPC ............................. H04N 23/745; H04N 23/73
See application file for complete search history.

(56) References Cited

U.S. PATENT DOCUMENTS

| | | | | |
|---|---|---|---|---|
| 11,350,048 B1 * | 5/2022 | Magnani | G06T 3/4007 | |
| 12,124,623 B1 * | 10/2024 | Berkovich | G06F 3/013 | |
| 2004/0155977 A1 * | 8/2004 | Clark, II | H04N 23/71 | 348/E5.035 |
| 2010/0321530 A1 * | 12/2010 | Baek | H04N 25/42 | 348/E5.037 |
| 2013/0082164 A1 * | 4/2013 | Oh | H04N 25/46 | 250/208.1 |
| 2017/0070663 A1 * | 3/2017 | Jo | G06T 3/4015 | |
| 2017/0163920 A1 * | 6/2017 | Hwang | H04N 25/10 | |
| 2021/0256285 A1 * | 8/2021 | Canini | G06K 7/10752 | |
| 2023/0319414 A1 * | 10/2023 | Yang | G06T 5/70 | |

* cited by examiner

*Primary Examiner* — Abdelaaziz Tissire
(74) *Attorney, Agent, or Firm* — Terrile, Cannatti & Chambers, LLP; Emmanuel A. Rivera

(57) ABSTRACT

Described herein are methods and systems for adjusting a camera system to account for high-lux flicker condition while maintaining camera high sensitivity capability. Automatic switching is performed from quad-Bayer binning (QBB) mode which provides for high sensitivity capability and sub-sampling mode that addresses high-lux condition. An engine, such as an auto exposure engine, performs the switching determining scene data captured by an image sensor and adjusting exposure time and gain, and instructing the image sensor to operate at QBB mode or sub-sampling mode.

20 Claims, 8 Drawing Sheets

SWITCHING MECHANISM FOR QUAD-BAYER BINNING AND SUB-SAMPLING

BACKGROUND OF THE INVENTION

Field of the Invention

The present invention relates to information handling systems. More specifically, embodiments of the invention provide for automatic switching of a webcam between quad-Bayer binning (QBB) and sub-sampling to prevent high-lux flickering.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include cameras or webcams (i.e., camera systems) used to capture/transmit video. It is preferable to implement a relatively high sensitivity camera for webcam applications, since a high sensitivity camera can provide good quality for low-light conditions. A high sensitivity camera can include a relatively larger pixel-size sensor and larger aperture lens, in order to perform well in low light conditions; however, such pixel size and aperture size can lead to the condition of high-lux flicker, which results in visible rapid fluctuations in light intensity. A low sensitivity camera can address the high-lux flicker condition, but image quality is reduced. Therefore, high-sensitivity cameras and low sensitivity cameras have optimal operating ranges. It is desirable to be able to make use of such operating ranges. A solution is the use of a mechanical iris to adjust lens aperture size for the webcam. Such a solution can be a relatively costly implementation.

SUMMARY OF THE INVENTION

A computer-implementable method, system, and computer-readable storage medium for adjusting a camera system to account for high-lux flicker condition comprising receiving scene data from an image sensor; determining exposure and gain for a subsequent frame of the scene; determining if exposure is less than 1/100 seconds; keeping at or switching to sub-sampling mode for the image sensor, if exposure is less than 1/100 seconds; redetermining exposure and gain for the subsequent frame of the scene if kept at or switched to sub-sampling mode; and applying the exposure and gain to the image sensor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various implementations provide for switching between quad-Bayer binning (QBB) and sub-sampling modes for an images sensor of a camera system (i.e., webcam of an information handling system). Such switching can be performed by an auto exposure (AE) engine or other engine implemented as firmware or software by the camera system. The AE engine automatically switches between QBB mode and sub-sampling mode to account for high-lux flicker situation ands support low light performance.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
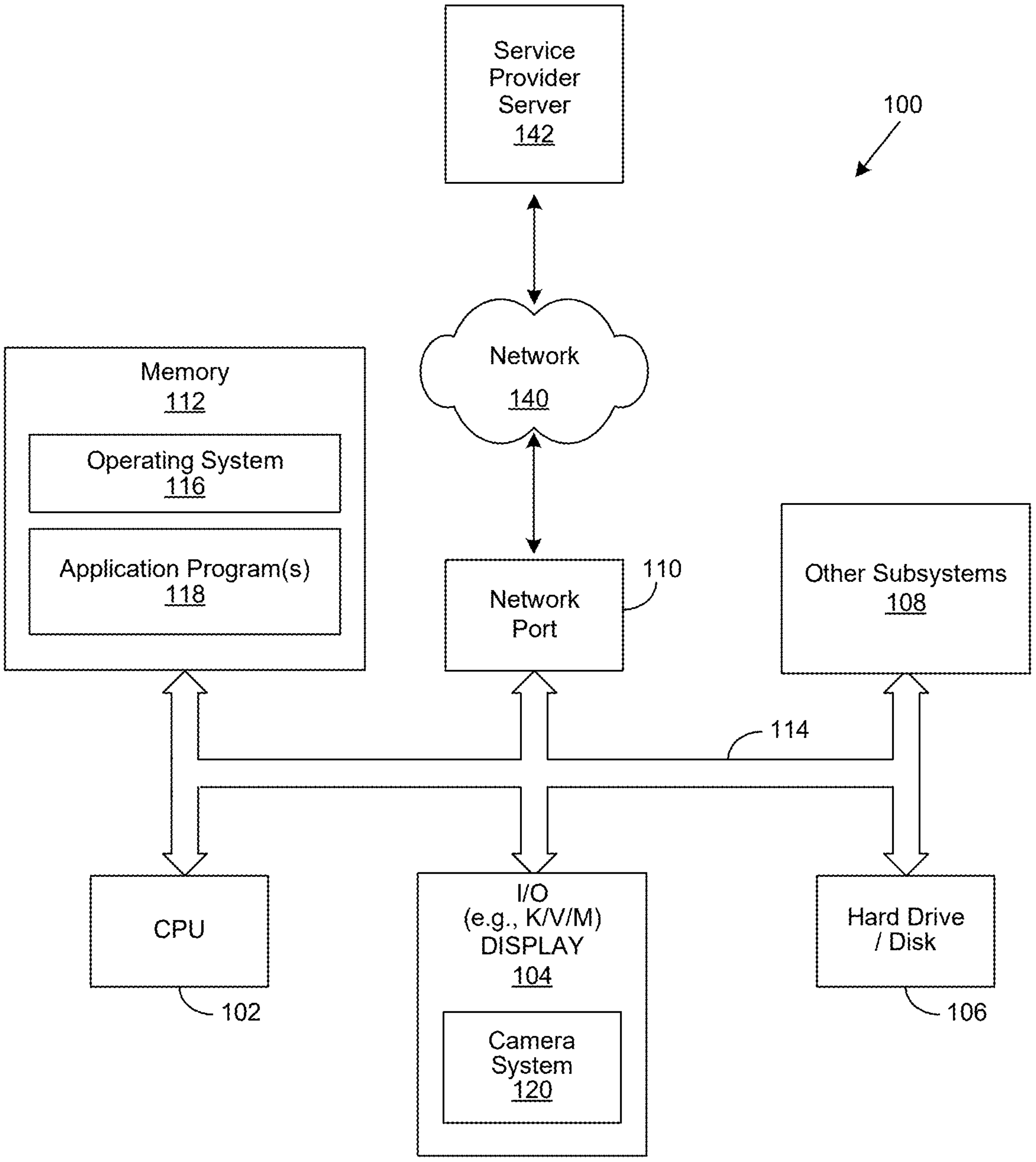
FIG. 1 is a general illustration of components of an information handling system as implemented in the present invention.

FIG. 1 is a generalized illustration of an information handling system 100 that can be used to implement the system and method of the present invention. The information handing system 100 can be a host to the peripheral devices described herein. The information handling system 100 can include a desktop computer, server computer, a laptop or notebook personal computer (PC), a tablet computer, PC integrated into a keyboard, etc. In particular, implementations described herein provide for a laptop or notebook PC system or tablet computer.

The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In particular, I/O devices 104 include a display as further described herein. As further described herein the display, embodiments of the display provide for specific components as implemented in the present invention.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114.

System memory 112 can be implemented as hardware, firmware, software, or a combination of such. System memory 112 further includes an operating system (OS) 116. Embodiments further provide for the system memory 112 to include software applications 118.

In various implementations, the I/O devices 104 can include a webcam or camera system 120. The camera system can be a peripheral of or integrated as part of the information handling system 100, such as a standalone webcam or a webcam as part of a laptop computer.

Figure 2:
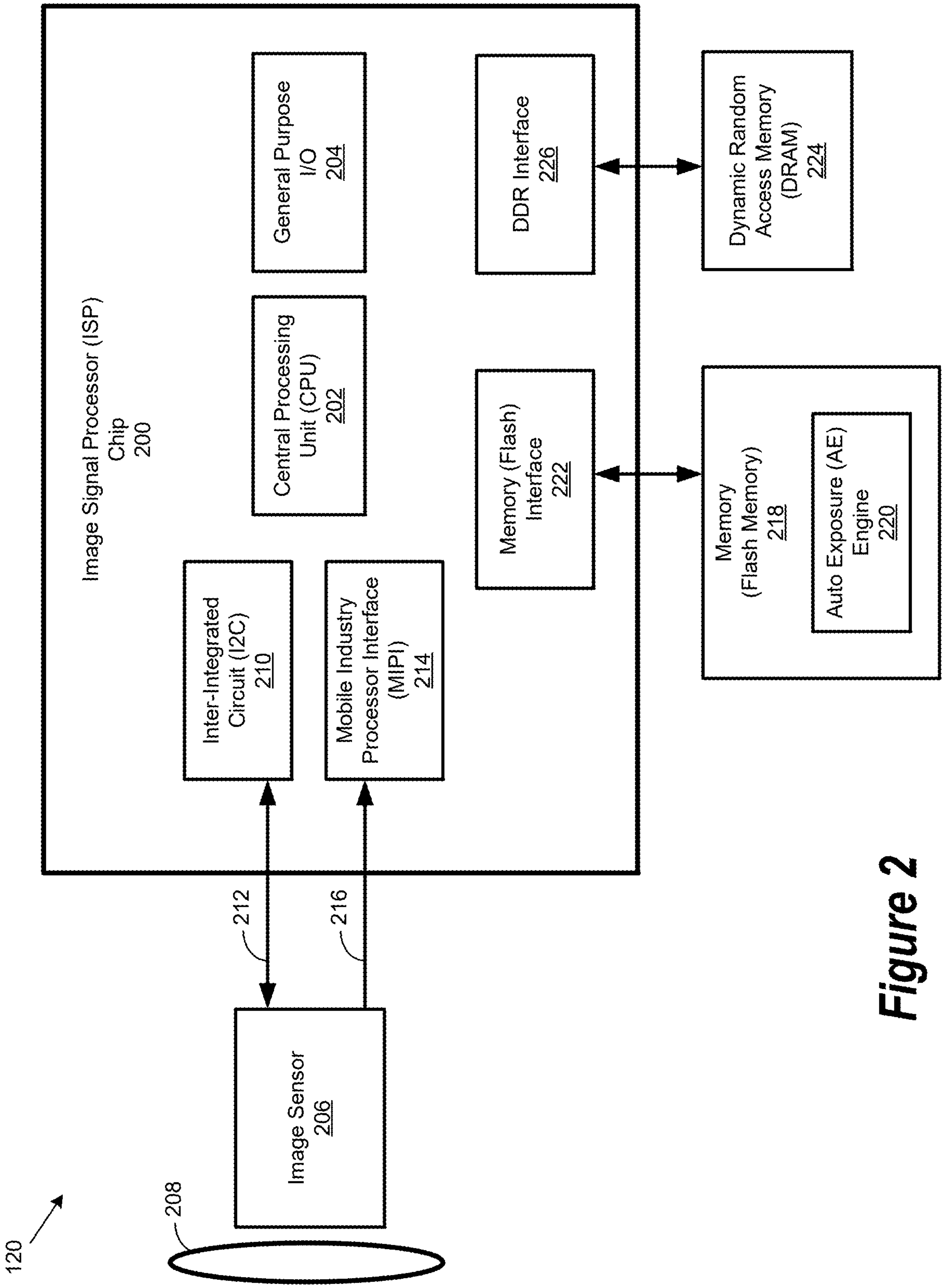
FIG. 2 is a generalized camera system implemented in the present invention.

FIG. 2 is a generalized camera system that can be implemented in the present invention. Embodiments provide for the camera system 120 as described in FIG. 1, to include an image signal processor (ISP) chip 200. Implementations provide for the ISP chip 200 to include a central processing unit(s) or CPU 202 and general purpose input/output (GPIO) 204.

Embodiments provide the camera system 120 to include an image sensor 206 and lens 208 to capture images/scenes. The image sensor 206 is described further herein, and implements quad-Bayer binning (QBB) mode and sub-sampling mode. As further discussed herein, QBB mode is used to support low light conditions, operating as a high sensitivity camera. In sub-sampling mode, high-lux flicker condition is addressed.

Implementations provide for the ISP chip 200 to communicate with image sensor 206, and can include an inter-integrated (I2C) interface 210 and a mobile industry processor interface (MIPI) interface 214. Certain implementations can also provide for the use of a serial peripheral interface (SPI) communications between the ISP chip 200 and image sensor 206. Bi-directional line 212 between image sensor 206 and I2C interface 210 can provide command data. Streaming data can be provided on line 216 from image sensor 206 to MIPI interface 214.

Further embodiments can provide for the camera system 120 to include memory (e.g., flash memory) 218. It is to be understood that other memory can be implemented, such as hardware, firmware, and software. Implementations provide that memory 218 to include applications, such as engines. In particular, an embodiment includes an auto exposure (AE) engine 220 as further described herein. Other engines can include auto white balance (AWB) and auto focus (AF). The AE engine 220 in particular performs automatic switching between QBB mode and sub-sampling mode at the image sensor 206. In certain implementations, the other engines can be used. A memory (e.g., flash memory) is provided at the ISP chip 200 for communication to the memory (e.g., flash memory) 218.

Embodiments further can provide for the camera system 120 to include dynamic random access memory 224 that communicates with the ISP chip 200 through a DDR interface. It is to be understood, the description of camera system 120 is an example, and other components can be included in various implementations to support the present invention.

Figure 3:
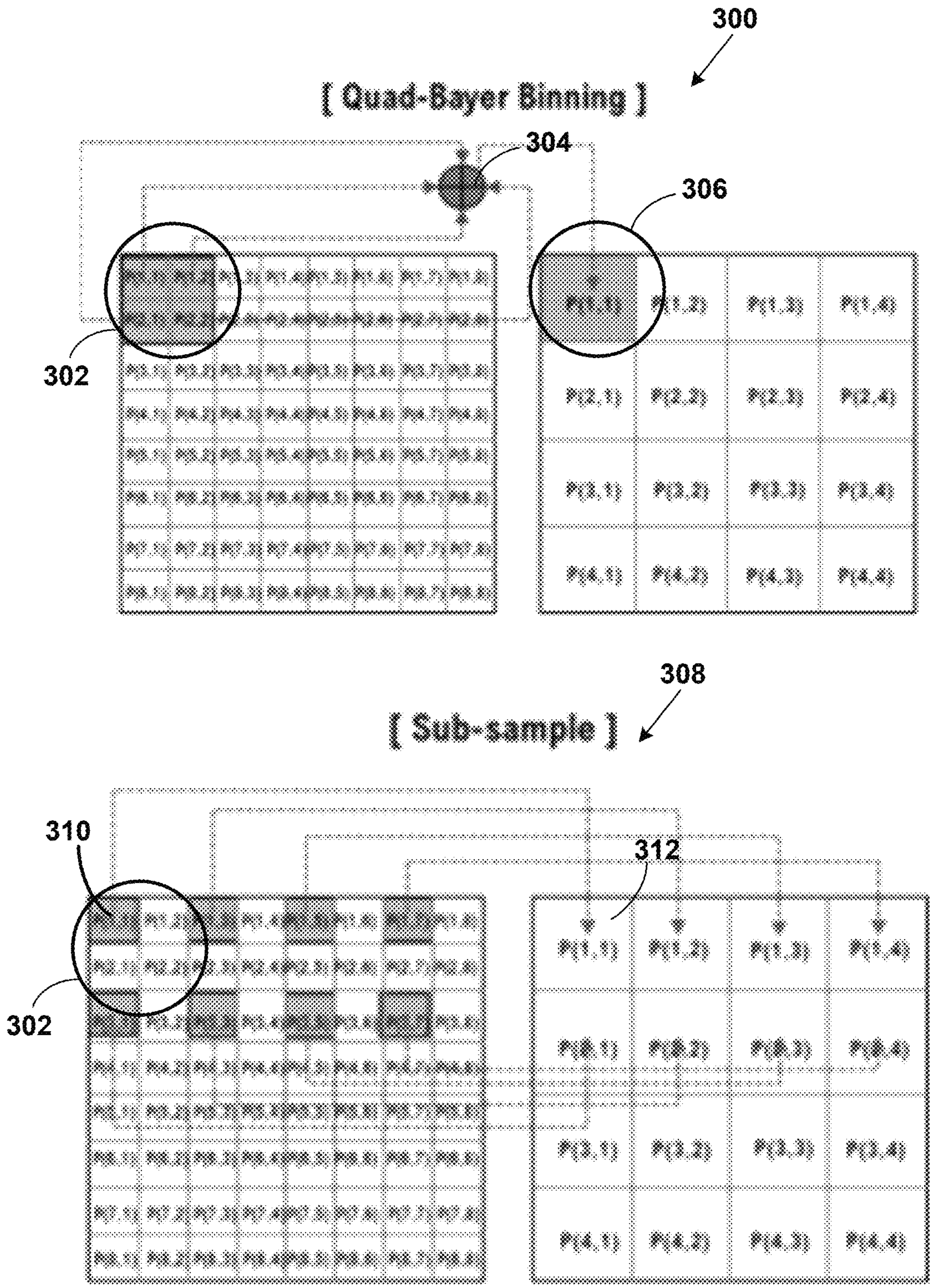
FIG. 3 is mapping of pixels using quad-Bayer binning (QBB) and sub-sampling.

FIG. 3 illustrates quad-Bayer binning (QBB) and sub-sampling. In particular, mapping of pixels using quad-Bayer binning (QBB) and sub-sampling. For example, QBB mapping or conversion 300 can be used to convert 48 Megapixels to 12 Megapixels or 1 micrometer pixel size performance to 2 micrometer pixel size performance. Four neighbor pixels 302 are fused or added 304 together to arrive at a target pixel 306. As discussed, QBB 300 can be used to support low light condition.

Sub-sampling mapping or conversion 308 can also be used to convert 48 Megapixels to 12 Megapixels or 1 micrometer pixel size performance to 1 micrometer pixel size performance. For sub-sampling mapping or conversion 302, a pixel 310 is selected from the group 302 (e.g., pick up from a row and column) and is used to arrive at target pixel 312. As discussed, sub-sampling can be used to support flicker high-lux flicker.

High-lux flicker situation can occur when ambient or environmental lighting (e.g. office lighting) is very bright, for example 1,000 or 10,000 lux, where one lux is equal to one lumen per square meter. Such a high-lux flicker situation can be seen in a flicker in a video image captured by the image sensor 206.

A progressive scan is performed on image sensor 206 in the horizontal direction and the vertical direction. For example, if environmental lighting (e.g., bulbs) are connected to a 50 Hz power source, an inverted waveform of the DC power line is 100 Hz (i.e., 1/100 sec). If at 50 Hz, exposure time of the image sensor 206 should keep with x/100 sec, where x is a positive integer. At 60 Hz, the exposure time of the image sensor 206 should keep with x/120 sec, where x is a positive integer.

If exposure is less than 1/100 sec (i.e., where x is less than 1), high-lux flicker is observed. To avoid high-lux flicker, either the size (aperture) of the lens 208 is reduced, or pixel size of the image sensor 206 is reduced (e.g., 2 micrometer pixel size to 1 micrometer pixel size). A larger pixel size (e.g., 2 micrometer) provides for better low-light performance. For example, 2 micrometer pixel size has lower noise than a smaller 1 micrometer pixel size at 10 lux. Signal to noise ratio for 2 micrometer pixel size at 10 lux is 30 decibels. Signal to noise ratio for 1 micrometer pixel size at 10 lux is 20 decibels.

For the larger 2 micrometer pixel size, there is a lower starting lux for flicker generation for high-lux condition. In other words, the larger 2 micrometer pixel size generates the high-lux flicker condition at a lower lux condition than the smaller 1 micrometer pixel size. For example, noise for a high sensitivity camera with 1 micrometer pixel size (e.g., sub-sampling mode) can start at 1 lux. Noise for a low sensitivity camera with 2 micrometer pixel size (e.g., QBB mode) can start at 50 lux. Flicker can start for a high sensitivity camera with 1 micrometer pixel size (e.g., sub-sampling mode) and can start at 500 lux. Flicker can start for a low sensitivity camera with 2 micrometer pixel size (e.g., QBB mode) and can start at 800 lux. Therefore, for certain implementations, switching between QBB mode (i.e., 2 micrometer pixel size) to sub-sampling mode (i.e., 1 micrometer pixel size) can take place at 500 lux.

Figure 4:
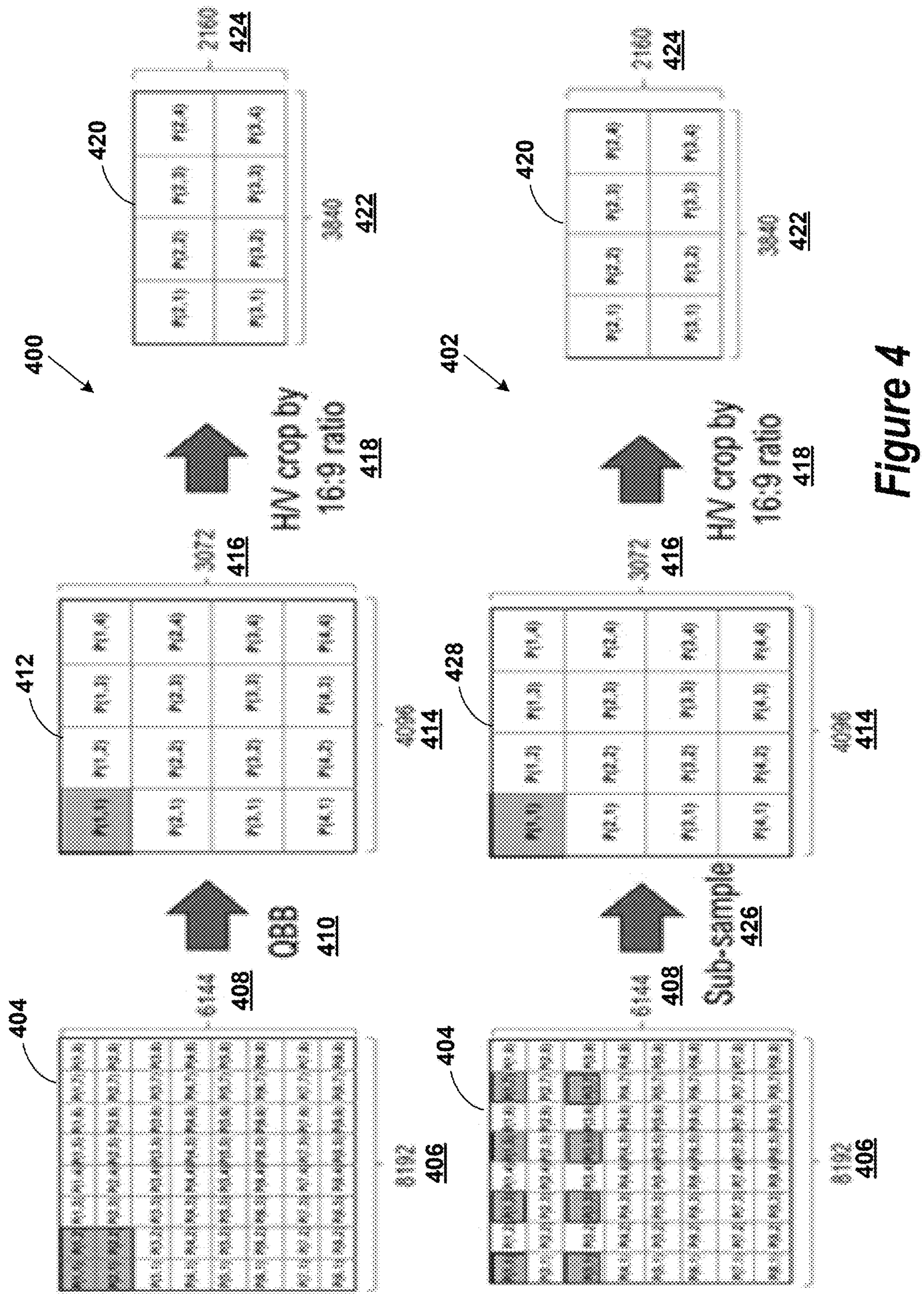
FIG. 4 shows converting to 4 K pixel resolution from 50 M pixel resolution.

FIG. 4 illustrates implementing 4K pixel resolution from 50 M pixels. The image sensor 206 may be a typical 50 M mobile device sensor. In certain webcam applications, 50 M pixels is not needed. For example, 4K (4,000) pixel resolution is needed. In particular, the use of QBB 400 and sub-sampling 402 are used to perform the conversion from 50 M pixel resolution to 4K pixel resolution. 4K resolution is typically 3840×2160 pixels, which means it has 3840 horizontal pixels and 2160 vertical pixels.

For QBB conversion 400, a 50 M pixel image 404 with 8192 horizonal pixels 406 and 6155 vertical pixels 408 is converted by QBB 410 to a QBB image 412 having 4096 horizontal pixels 414 and 3072 vertical pixels 416. A horizontal/vertical (H/V) crop 418 is preformed to arrive at 4K resolution image 420 having 3840 horizonal pixels 422 and 2160 vertical pixels 424.

For sub-sampling conversion 402, the 50 M pixel image 404 with 8192 horizonal pixels 406 and 6155 vertical pixels 408 is converted by sub-sampling 426 to a sub-sampling image 428 having 4096 horizontal pixels 414 and 3072 vertical pixels 416. A horizontal/vertical (H/V) crop 418 is preformed to arrive at 4K resolution image 420 having 3840 horizonal pixels 422 and 2160 vertical pixels 424.

Figure 5:
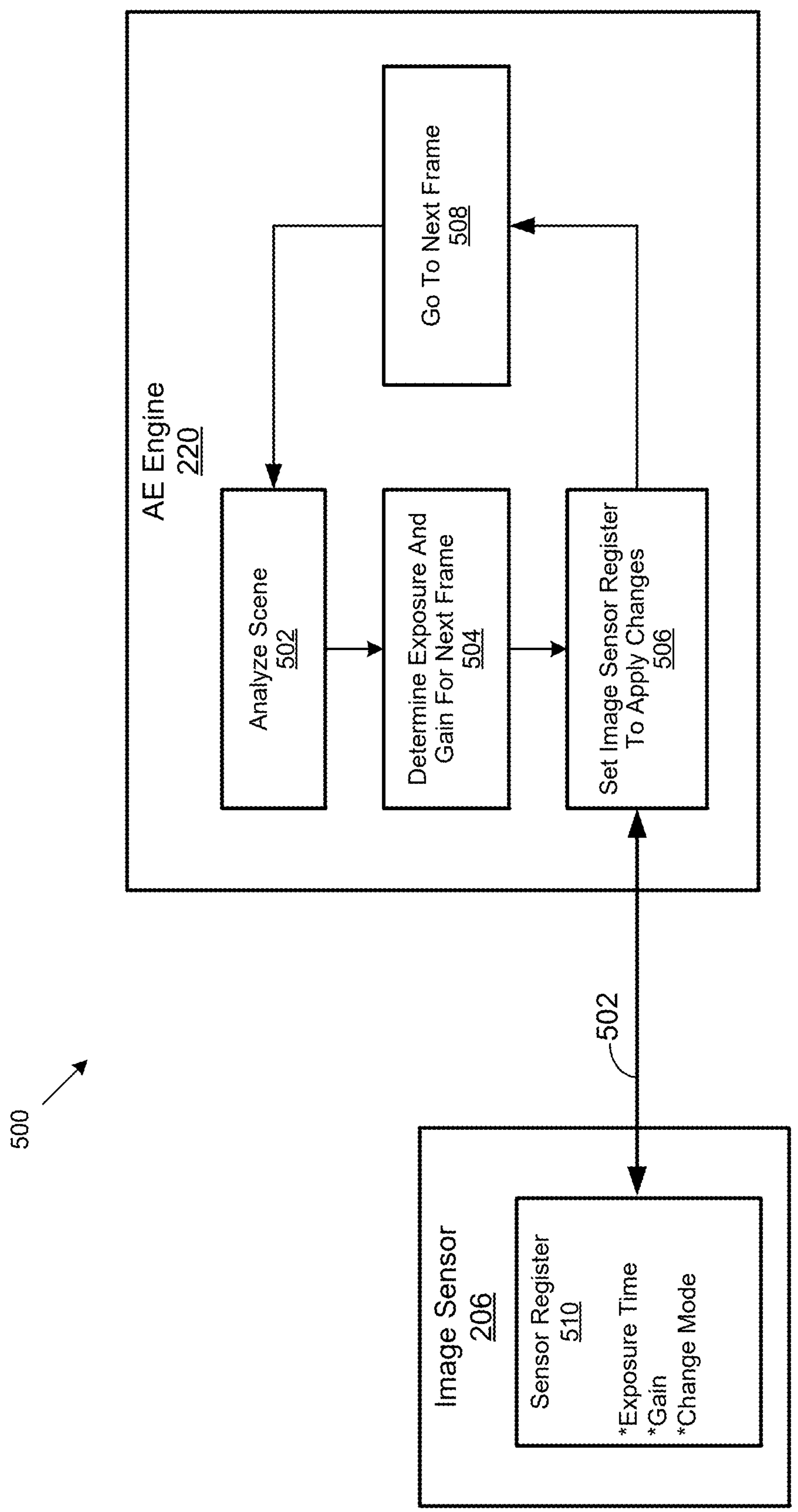
FIG. 5 shows interaction between image sensor and auto exposure (AE) engine.

FIG. 5 illustrates interaction between the image sensor and AE engine. The image sensor 206 scans scenes through the lens 208 capturing images or frames of images. The AE engine 220 is implemented to evaluate scene brightness for every frame, and determines exposure and gain. This is illustrated in the interaction 500.

As discussed above, ISP chip 200 can communicate to the image sensor 206 through an I2C interface 210 and bi-directional line 212. The AE engine 220 can indirectly communicate to the image sensor 206 through the I2C interface 210 and bi-directional line 212 and/or a serial peripheral interface (SPI) and line, as represented by 502.

The image sensor 206 sends scene image data to AE engine 220. At 502, the AE engine 220 analyzes the scene for a frame 504. At 506, a determination is made by the AE engine 220, as to exposure and gain for the next frame in the scene. At 508, the AE engine 220, sets image sensor register to apply exposure and gain changes in a register accessible by the image sensor 206. The image sensor register (i.e., a register accessible by the image sensor 206) can be located at the ISP chip 200. At 510, the AE Engine 220 proceeds to the next frame of the scene. The sensor register 512 stores exposure time, gain and change mode (i.e., change between QBB mode and sub-sampling mode).

Figure 6:
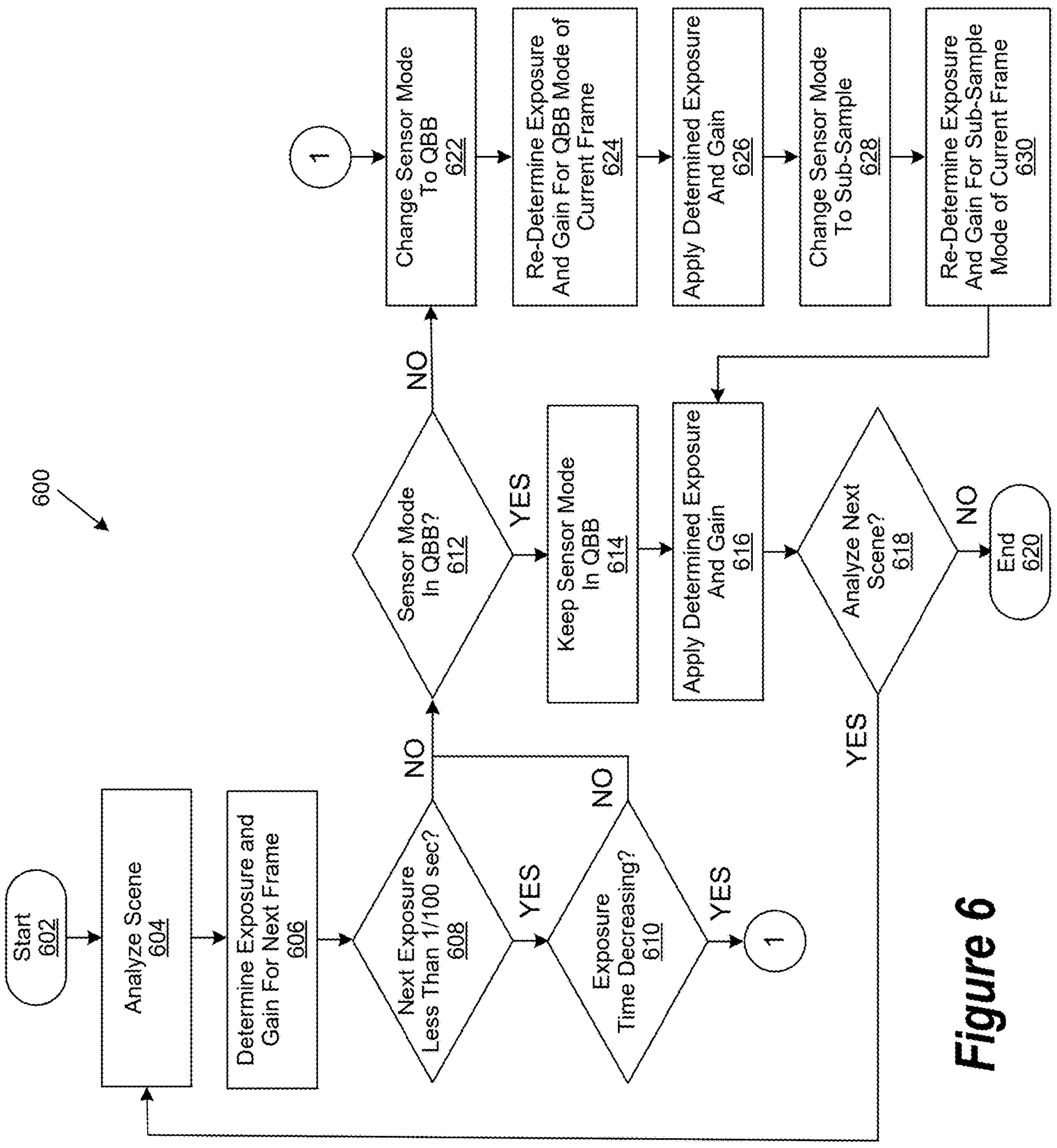
FIG. 6 is a generalized flowchart for automatic switching between quad-Bayer binning (QBB) mode and sub-sampling mode.

FIG. 6 is a generalized flowchart 600 for automatic switching between QBB mode and sub-sampling mode. In certain implementations, the AE engine 220, other engine, software, firmware, hardware, etc. of the camera system 120 performs process 600. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, the image sensor 206 scans and captures scenes of images (i.e., frames) and sends data to the AE engine 200. The scene is analyzed by the AE engine 200. At step 606, the AE engine 200 determines exposure and gain for the next or subsequent frame of the scene.

A determination is made if the determined next exposure is less than 1/100 sec. If the next exposure is less than 1/100 sec, following the YES branch of step 608, a determination is made if exposure time is decreasing from the last frame. If exposure time is not decreasing from the last frame (previous of subsequent frame), following the NO branch of step 610, a determination is made if image sensor 206 is in QBB mode. If the image sensor 206 is in QBB mode, following the YES branch of step 612, at step 614, the image sensor 206 is kept in QBB mode. At step 616, the determined exposure and gain are applied to the image sensor 206 (i.e., determined exposure and gain stored in sensor register 512).

At determination is made whether to analyze the next or subsequent scene. If the next scene is not to be analyzed, following the NO branch of step 618, the process ends at step 620. If the next scene is to be analyzed, following the YES branch of 618, process 600 goes to step 604.

If exposure time is decreasing from the last frame, following the YES branch of step 610, at step 622, sensor mode of image sensor 206 is changed to/kept at QBB mode. At step 624, a re-determination is performed as to exposure and gain at QBB mode of the current frame. At step 626, the determined exposure and gain are applied to the image sensor 206 (i.e., determined exposure and gain stored in sensor register 512).

At step 628, sensor mode of image sensor 206 is changed to sub-sampling mode. At step 630, a re-determination is performed as to exposure and gain at sub-sampling mode of the current frame. The process proceeds to step 616. If the image sensor 206 is not in QBB mode, following the NO branch of step 612. The process 600 proceeds to step 622.

Figure 7:
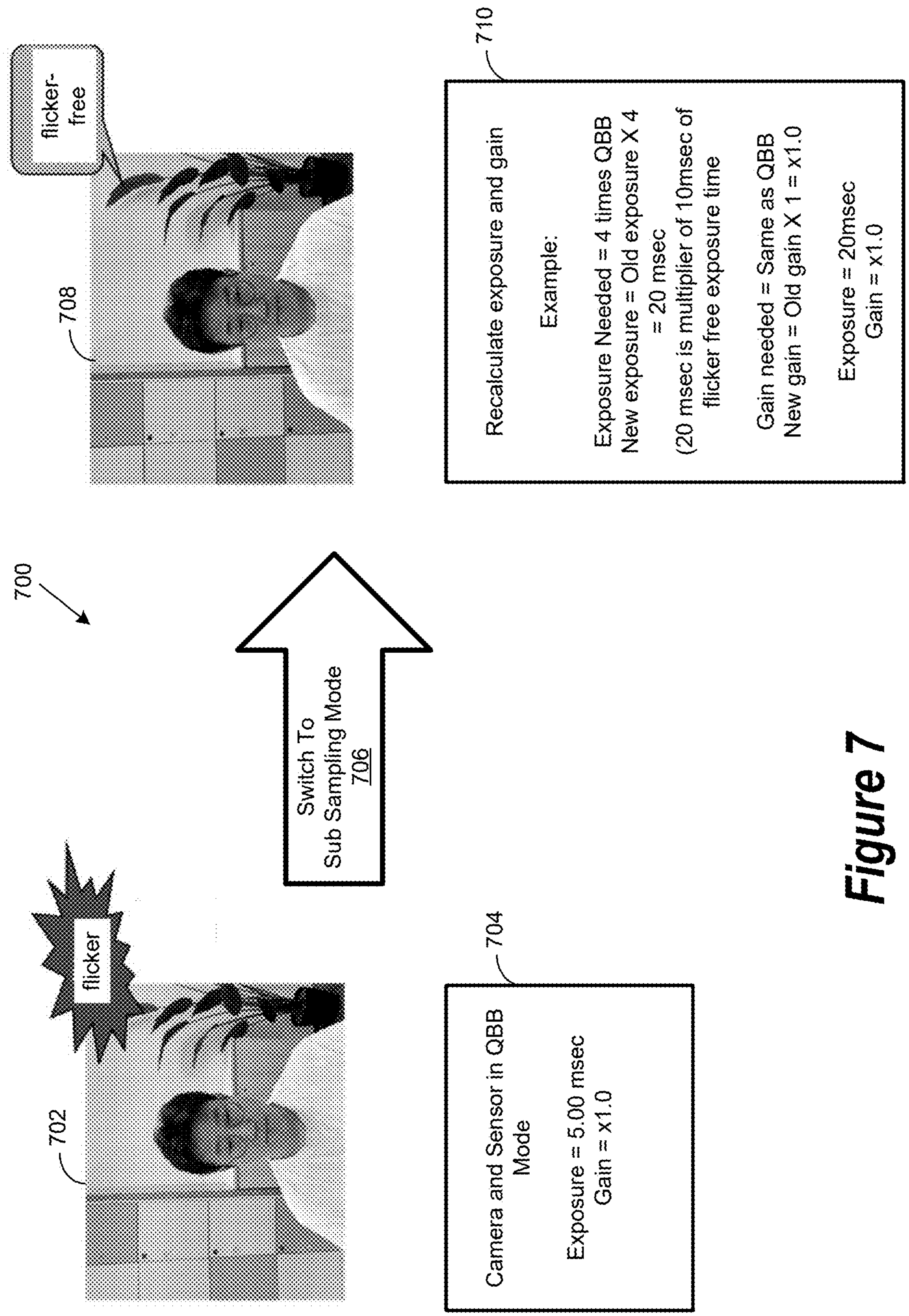
FIG. 7 shows switching from quad-Bayer binning (QBB) mode and sub-sampling mode if flicker is detected.

FIG. 7 illustrates switching from quad-Bayer binning (QBB) mode and sub-sampling mode if flicker is detected. The example 700 shows an image 702 that has flicker. The image sensor 206 is in QBB mode as shown in 704. The example exposure is 5 msec and gain is ×1.0.

As discussed above, automatic switching is performed to switch to sub-sampling mode 706. A flicker free image 708 is provided. In 710, a re-determined/recalculated exposure and gain are shown. For example, exposure is four times QBB mode exposure, where the new exposure value is four times 5 msec or 20 msec. Gain is the same as in QBB mode. Therefore, exposure is 20 msec and gain is ×1.0.

Figure 8:
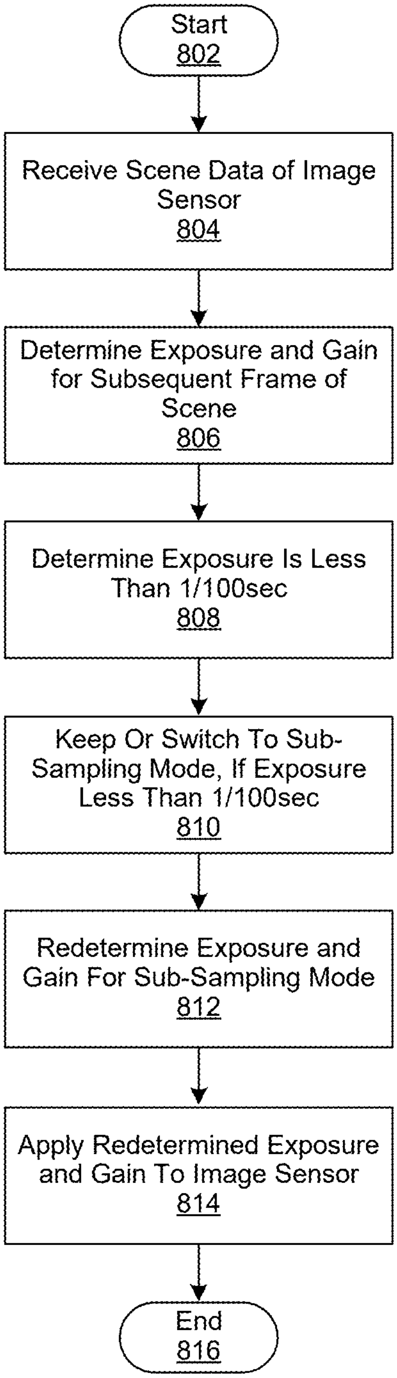
FIG. 8 is a generalized flowchart for adjusting a camera system to account for high-lux flicker.

FIG. 8 is a generalized flowchart 800 for adjusting a camera system to account for high-lux flicker. In certain implementations, the AE engine 220, other engine, software, firmware, hardware, etc. of the camera system 120 performs process 800. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 802, the process 800 starts. At step 804, the image sensor 206 scans and captures scenes of images (i.e., frames). The scene image data is received by the AE engine 200. At step 806, a determination is performed as to exposure and gain of a subsequent frame of the scene. At step 808, a determination is performed if exposure is less than 1/100 sec, which can indicate a high-lux flicker condition. At step 810, the image sensor 206 may be in QBB mode or sub-sampling mode. If exposure is less than 1/100 sec, indicating a possible high-lux flicker condition, the image sensor 206 is switched from QBB mode or kept at sub-sampling mode. At step 812, a redetermination is performed as to exposure and gain for the subsequent frame for sub-sampling mode. At step 814, the redetermined exposure and gain are applied to the image sensor 206. At step 816, the process 800 ends.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for adjusting a camera system to account for high-lux flicker condition comprising:

receiving scene data from an image sensor;

determining exposure and gain for a subsequent frame of the scene;

determining if exposure is less than 1/100 seconds;

keeping at quad-Bayer binning (QBB) mode or switching to sub-sampling mode for the image sensor, if exposure is less than 1/100 seconds;

redetermining exposure and gain for the subsequent frame of the scene if kept at or switched to sub-sampling mode; and applying the exposure and gain to the image sensor.

2. The computer-implementable method of claim 1, wherein an auto exposure engine performs the steps.

3. The computer-implementable method of claim 1 further comprising determining if exposure time of the subsequent frame is decreasing and keeping the image sensor in QBB mode.

4. The computer-implementable method of claim 1, wherein QBB mode is implemented when high-lux flicker is not observed.

5. The computer-implementable method of claim 1, wherein QBB mode provides 2 micrometer pixel size at the image sensor and sub-sampling mode provides 1 micrometer pixel size at the image sensor.

6. The computer-implementable method of claim 1 further comprising reducing the image sensor pixels by QBB or sub-sampling.

7. The computer-implementable method of claim 6 further comprising cropping to 4K resolution.

8. A system comprising:

a plurality of processing systems communicably coupled through a network, wherein the processing systems include non-transitory, computer-readable storage medium embodying computer program code interacting with a plurality of computer operations for adjusting a camera system to account for high-lux flicker condition comprising:

receiving scene data from an image sensor;

determining exposure and gain for a subsequent frame of the scene;

determining if exposure is less than 1/100 seconds;

keeping at quad-Bayer binning (QBB) mode or switching to sub-sampling mode for the image sensor, if exposure is less than 1/100 seconds;

redetermining exposure and gain for the subsequent frame of the scene if kept at or switched to sub-sampling mode; and applying the exposure and gain to the image sensor.

9. The system of claim 8, wherein an auto exposure engine performs the steps.

10. The system of claim 8 further comprising determining if exposure time of the subsequent frame is decreasing and keeping the image sensor in QBB mode.

11. The system of claim 8, wherein QBB mode is implemented when high-lux flicker is not observed.

12. The system of claim 8, wherein QBB mode provides 2 micrometer pixel size at the image sensor and sub-sampling mode provides 1 micrometer pixel size at the image sensor.

13. The system of claim 8 further comprising reducing the image sensor pixels by QBB or sub-sampling.

14. The system of claim 8 further comprising cropping to 4K resolution.

15. A non-transitory, computer-readable storage medium embodying computer program code for adjusting a camera system to account for high-lux flicker condition, the computer program code comprising computer executable instructions configured for:

receiving scene data from an image sensor;

determining exposure and gain for a subsequent frame of the scene;

determining if exposure is less than 1/100 seconds;

keeping at quad-Bayer binning (QBB) mode or switching to sub-sampling mode for the image sensor, if exposure is less than 1/100 seconds;

redetermining exposure and gain for the subsequent frame of the scene if kept at or switched to sub-sampling mode; and applying the exposure and gain to the image sensor.

16. The non-transitory, computer-readable storage medium of claim 15, wherein an auto exposure engine performs the steps.

17. The non-transitory, computer-readable storage medium of claim 15 further comprising determining if exposure time of the subsequent frame is decreasing and keeping the image sensor in QBB mode.

18. The non-transitory, computer-readable storage medium of claim 15, wherein QBB mode is implemented when high-lux flicker is not observed.

19. The non-transitory, computer-readable storage medium of claim 15, wherein QBB mode provides 2 micrometer pixel size at the image sensor and sub-sampling mode provides 1 micrometer pixel size at the image sensor.

20. The non-transitory, computer-readable storage medium of claim 15 further comprising reducing the image sensor pixels by QBB or sub-sampling.

* * * * *